United States Patent [19]

Merrill, Jr.

[11] 4,424,021
[45] Jan. 3, 1984

[54] METHOD FOR RETORTING CARBONACEOUS PARTICLES

[75] Inventor: LaVaun S. Merrill, Jr., Englewood, Colo.

[73] Assignee: Marathon Oil Company, Findlay, Ohio

[21] Appl. No.: 335,906

[22] Filed: Dec. 30, 1981

[51] Int. Cl.$^3$ .................... F27B 15/00; F26B 3/00; C10G 1/00

[52] U.S. Cl. .......................................... 432/14; 34/25; 208/11 R

[58] Field of Search .................... 432/13, 14; 34/25; 208/11 R; 201/21, 24

[56] References Cited

U.S. PATENT DOCUMENTS

| | | | |
|---|---|---|---|
| 926,702 | 6/1909 | Korting | 414/163 |
| 1,906,755 | 5/1933 | Karrick | 201/24 |
| 2,270,903 | 1/1942 | Rudbach | 34/25 |
| 2,614,069 | 10/1952 | Matheson | 202/6 |
| 2,626,234 | 1/1953 | Barr et al. | 202/6 |
| 3,325,395 | 6/1967 | Ban | 208/9 |
| 4,039,427 | 8/1977 | Ban | 208/11 |
| 4,196,051 | 4/1980 | Haley et al. | 201/24 |
| 4,260,370 | 4/1981 | Goldman et al. | 432/14 |
| 4,332,669 | 6/1982 | Spars et al. | 208/11 R |

Primary Examiner—John J. Camby
Attorney, Agent, or Firm—Jack L. Hummel

[57] ABSTRACT

In this process carbonaceous materials in a wide range of particles size are heat treated in a substantially vertical gravity retort through which heated gasses flow upwardly. The particles are graded by size and fed into the retort with the largest particles being inserted into an upper portion of the retort, and in preferred embodiments, with progressively smaller particles being inserted into progressively lower portions of the retort so that the residence time of each of the particles in the retort is substantially directly proportional to the size and mass of the particles. This process allows high throughput of the material while reducing the amount of entrained small particles which flow up with the heated gas, thus reducing pressure drop in the retort system.

13 Claims, 1 Drawing Figure

METHOD FOR RETORTING CARBONACEOUS PARTICLES

DESCRIPTION

1. Technical Field

This invention relates to processes for the thermolytic treatment of particles. More particularly it relates to processes for arranging and heat treating particles including carbonaceous materials of varying sizes in a gravity feed retort.

2. Background Art

The process of heating carbonaceous materials to carbonize them or to distill (devolatilize) therefrom various by-products is well known in the art. The heating environment can be variously selected to be, for example, a retort, a kiln, a drum, a grate, a hearth and so-forth. Where a retort is selected it can be either a static heating system or a dynamic heating system. One such prior art dynamic system is a gravity feed retort.

A gravity feed retort system normally utilizes a substantially vertical cylinder as a retort, one or more points of entry for the introduction of to-be-treated materials into the retort and one or more entry locations, at a relatively low portion of the retort, for the introduction of compressed heated gas. In such a system the to-be-treated materials are subjected to heating by heat exchange from the hot gas while moving downward at a controlled rate through the retort. At the same time the heated gas flows upward at a controlled rate and temperature. Where carbonaceous materials have been treated in such a gravity feed retort, they have normally been in the form of a mixture of subdivided particles of various sizes, with the type, temperature and flow rate (or weight ratio) of the heated gas being selected in accordance with both the material which is undergoing treatment and the result which is desired to be achieved.

The advantages of processes using a dynamic gravity feed retort are substantial. For example, the process is continuous, the contact between the solid particles and the heated gases is quite good, and therefore the system is potentially very efficient. However, it has been determined that in situations in which mixtures of particles of widely varying sizes are inserted into the retort, that all of the particles cannot be efficiently and uniformly heated to a desired treating temperature. This is due to the fact that the temperature attained in each particle is a function, not only of the temperature of the heating gas and the residence time of the particles within the retort, but it is also a function of the surface area and the mass of each particle. Therefore, in a mixture of particle sizes, the smallest particles (which have the greatest ratio of surface area to mass) are heated relatively quickly to the desired temperature, or higher, while the larger particles are not heated as quickly, or perhaps are not heated completely, due to their lower ratio of surface area to mass. In the prior art, this has resulted in systems which are inefficiently designed so that they are capable of completely heating the largest particles. Additionally, the prior art retort systems have required, due to pressure drop, substantial compression in order to move the heated gas upward through the retort. The greater the compression required, generally, the more costly is the blower or compressor which is required in the system.

Retorting operations of the character described above have been employed for many processes, including carbonization or devolatilization of particles including carbonaceous material such as oil shale, coal or the like, and have also been utilized for a large number of other exothermic and endothermic reactions. More specifically, successful use of such dynamic retort techniques has been made in the devolatilization, educting or distillation of petroleum products from shale. However, while the application of such dynamic retorting techniques has found extensive use, as noted above, there are inherent limitations in the technique as currently utilized which have affected its efficiency and limited its use.

As already noted, one of the more serious limitations to the use of such a gravity feed retort technique has now been found to result from the fact that, for practical purposes, proper heat treatment is limited by retort height and pressure drop considerations to a relatively narrow size distribution of carbonaceous material containing particles for a system of gas heated to a specific temperature and moving at a specific gas flow rate. For example, more specifically, some particles may be properly heated for distillation or carbonization at a gas rate of, say, about 0.5 lb (0.23 kg) to about 1 lb (0.45 kg) per 1 lb (0.45 kg) of carbonaceous material containing particles undergoing treatment at a temperature in the range of about 932° F. (500° C.) to about 1562° F. (850° C.) and a particle size distribution ranging from about ¼ inch (0.6 cm) to about 2 inches (5.1 cm). In such a system particles considerably larger than the size range indicated will tend to pass through the system without being completely heated for devolatilization or carbonization, while particles considerably smaller than the indicated size range may be entrained in the gas and carried up through the system along with the heated gas and distillate. In a more practical sense, if larger particles are used in state-of-the art retort systems, then higher retorts (with longer heating zones) are required. An increase in retort size with increased particle size would in turn lead to an increase in pressure drop (requiring greater and more expensive compression) and an inability to treat smaller particles (thus requiring the smaller particles to be discarded). In a similar manner, if smaller particles (or more small particles) are used in a state-of-the art retort, then again pressure drop increases and more fine particles are entrained in and carried off with the gas. It is therefore seen that state-of-the art systems are designed within rather narrow limits to meet particle size, pressure drop and carry over limitations. Therefore, neither the unduly large, incompletely heated particles, nor the unduly small entrained particles may derive full and efficient benefit from the use of such a state-of-the art gravity retort process. This situation become particularly troublesome when it is desired to retort materials which, due to either prior treatment or naturally, are in the form of subdivided particles whose sizes spread over a wide range. For example, many types of oil shale and coal which may be subjected to retorting are obtained in the course of conventional processing in the form of masses composed of particles varying in size from a few microns to as much as 5 or 6 inches (12.7 or 15.2 cm). This usually requires reduction of the larger particles and discarding of the smaller particles. Additionally, when masses of particles of mixed sizes of particles are inserted into the retort as a mixture, the permeability of the bed fluctuates due to the inconsistancy of the mixture. Thus the gas flow rate of the system must be continuously checked and adjusted in order to compensate for the continuous shift in the pressure within the system due to the mixture of particle sizes.

Various systems and processes for heat treating carbonaceous particles, with or without concern for their sizes are taught in the prior art. For example, in U.S. Pat. No. 926,702 to Korting coal is separated into coarse and fine particles and then batch fed into a static retort from the top so that a column of coarse particles resides adjacent to a column of fine particles in the retort during heating. In U.S. Pat. No. 2,614,069 to Matheson carbonaceous particles are heated in a vertical fluidized bed reactor into which the largest particles (none larger than about ½ inch) are fed in at the top, intermediate sized particles are fed in at a lower level, smaller particles are fed in at a yet lower level, and so on, with all of the particles then being fluidized with a high velocity heated gas to form a turbulent mass. It is noted that in the system of this reference the largest particles tend to have the shortest residence time, that heating time is not controlled for any of the particles and the system, once built, cannot be modified to treat larger particles.

U.S. Pat. No. 3,325,395 to Ban teaches a traveling grate system for the recovery of oil from shale whereby the smallest particles are placed on the grate and layers of progressively larger particles are placed above them. In U.S. Pat. No. 1,906,755 distillation of coal sorted in size layers on a perforated hearth, with the coarsest on the bottom and the finest on the top, is taught. U.S. Pat. No. 2,626,234 discloses a fluidized bed oil shale retort which features heat exchange. U.S. Pat. No. 4,039,427 discloses a traveling grate system for oil shale treatment which lays oil-depleted material on oil-bearing material and then combusts the oil-depleted material to heat the oil-bearing material. U.S. Pat. No. 4,196,051 discloses a system in which coarse and fine coal is located in alternate, side-by-side rows on a horizontal moving grate running through a coking furnace.

It will be noted that none of the discussed known prior art discloses a dynamic, straight through, substantially vertical gravity feed retort system in which particles larger than ½ inch (1.3 cm) are fed into the retort from a plurality of locations, with the particles of the greatest size being introduced at the highest level of the retort and with particles of successively reduced sizes being introduced at successively lower levels, the particles then being heated with a hot gas flowing at a non-fluidizing rate such that substantially all of the particles flow straight down through the retort at an adjustable controlled rate and with the temperature, and flow rate of the gas being such that pressure drop in reduced and each of the particles, regardless of its size, are in the retort for a time substantially directly proportional to its mass so that all of the various size particles are substantially completely uniformly heated.

BRIEF DESCRIPTION OF THE INVENTION

The present invention overcomes the aforementioned difficulties and affords various additional advantages.

These advantages, the nature of the invention and the manner in which it is carried out will be more fully understood from the following description thereof.

It is the principal object of the present invention to provide improved means for maintaining proper and uniform heating of subdivided particles having their sizes spread over a wide range.

A more specific object of the present invention is to provide means for completely distilling or carbonizing particles containing carbonaceous material, which particles have a wide range of size distribution.

It is another object of the present invention to provide a gravity feed retort system in which the maximum size of particle which may be treated is increased and the minimum size of particle which can be treated is reduced.

Other and more specific objects and advantages of the invention will appear hereinafter.

In accordance with the present invention, these objects and advantages may be accomplished, quite generally, by supplying to a non-turbulent vertical gravity feed retort system particles which have been first sorted according to size, and then supplying the larger particles to an upper portion of the retort and supplying successively smaller particles to successively lower portions of the retort so that substantially all of the particles are in the retort for a period of time substantially directly proportional to their size. In other words, the invention provides a system for supplying to a gravity fed retort the larger particles at the upper portion of the retort and successively smaller particles at successively lower portions of the retort. By this means the smaller particles, which would otherwise tend to be entrained in the heated gas and rise upwardly through the retort to cause pressure drop, encounter the descending larger particles so that all of the particles tend to continue on a direct and continuous path downwardly through the retort. This also results in the larger particles being in the retort for the longest period of time so that their greater size or mass is subjected to a longer period of heat exchange. At the same time, the successively smaller particles, which can be heated to their devolatizing or carbonizing temperature in successively shorter times are within the retort for successively shorter periods of time. In this manner subdivided particles varying greatly in size can be continuously fed through a single non-turbulent gravity retort to produce a substantially complete and uniform heating of all of the particles, with the resulting more uniform and thus improved heat treatment of all of the particles. Furthermore, the insertion of the larger particles only at the upper portion of the retort provides the additional benefit that it tends to maintain substantially more uniform pressure within the retort. Thus, in the practice of the present invention when treating particles of widely varying size there is little pressure fluctuation and less pressure drop within the retort, with the result that little pressure control or modification is required and less expensive compression equipment can be used.

As already noted, the larger particles inserted in the upper portion of the retort also tend to pull the smaller particles down through the retort and thus substantially eliminate the entrainment of the smaller particles throughout the retort within the upwardly flowing heated gas. The decrease in pressure drop is due to the fact the smaller particles are present in a controlled section of the retort, rather than throughout the retort, due to the pull down effect of the larger particles on the smaller particles. The insertion of the larger particles in the upper portion of the retort also allows even smaller or finer material to be added to the retort below the point of insertion of the largest particles. Furthermore, due to this effect, the length of the retort below the insertion area of the larger particles may be shorter than in the prior art. Similarly, the retort needs to be lengthened only slightly to accommodate very large particles. Concomitantly, if larger particles can be used then the amount of fines produced during crushing or grinding is reduced. Additionally, as would be expected, such an efficient system may allow a great amount of material throughput without a concomitant need to increase the temperature of the heated gas or the size of the retort.

More specifically, in processes involving the continuous feed of solid particles varying in size over a wide range, the particle charge, in accordance with the present invention, is divided into at least two fractions, each fraction being a substantial continuum of particle sizes which do not substantially overlap with the particle sizes of the next sized fraction continuum. Thus, in a two fraction system, the fraction comprising predominantly the largest particles are inserted into the retort at an upper portion of the retort while the fraction comprising predominantly particles of a smaller size range are inserted into the retort at a lower portion of the retort. Of course, fractions composed of successive size ranges of particles, intermediate a largest and a smallest particle size range, may be, in accordance with the teaching of the present invention, fed to intermediate sections of the retort, with the largest intermediate sized particles inserted next below the very largest particles and with successively smaller particles being inserted at successively lower portions of the retort, as desired. In such a system the rate of flow of the heated gasses is maintained at a non-fluidizing rate so that substantially all of the particles move substantially non-turbulently and continuously downwardly through the retort. The procedure of the present invention is particularly suitable for the treatment of carbonaceous material containing solids such as oil shale, coal, lignite, peat, tar sands, coke, oil coke, and so on. The particles treated in accordance with the teaching of the present invention may be obtained from natural or artifical sources, or may be specifically prepared for the system by subdividing masses, the particle size of which spreads over wide ranges.

Other details, objects and advantages of the invention will become apparent from the following detailed description, with reference to the accompanying drawing.

DESCRIPTION OF THE PREFERRED EMBODIMENTS

Figure 1:
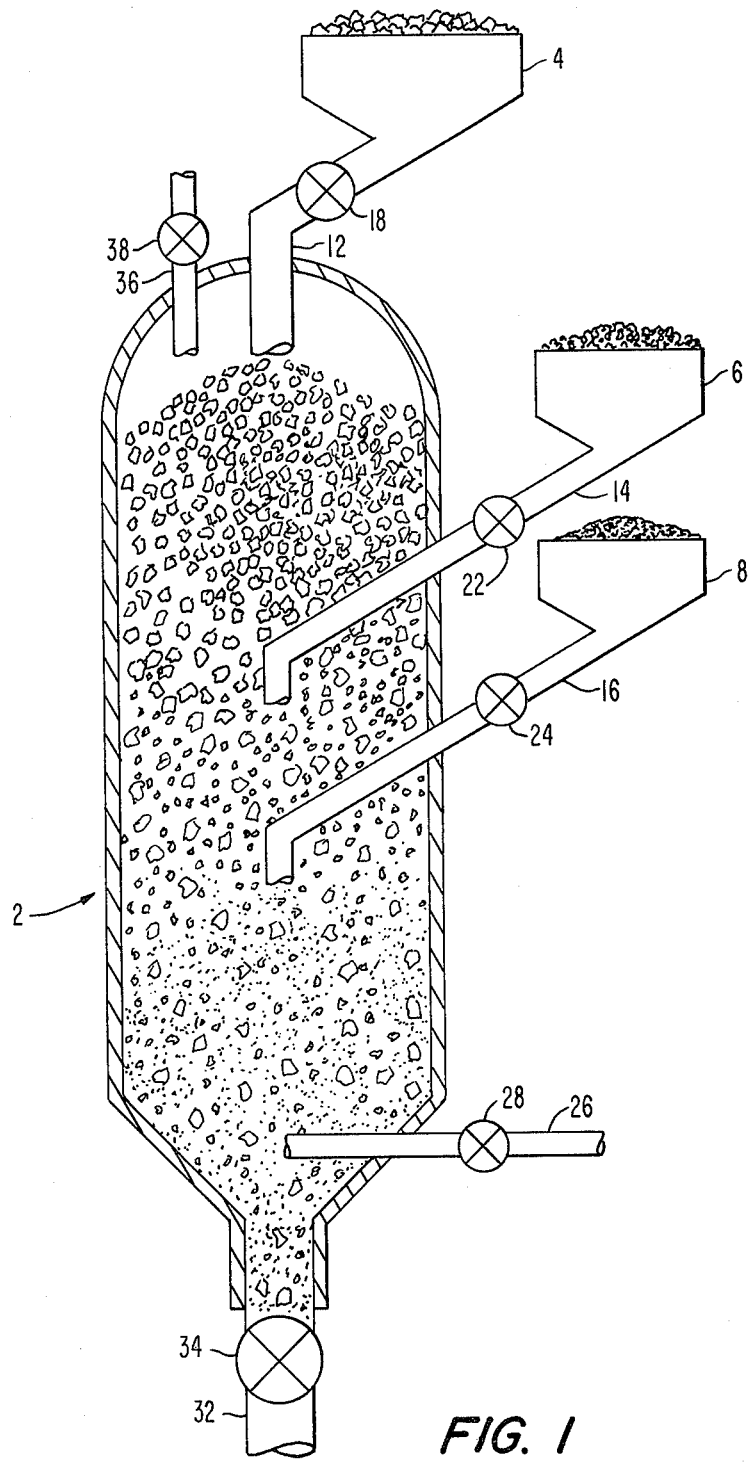
FIG. 1 is a partly schematic, partly diagrammatic illustration of a system suitable for carrying on the process of the present invention.

Referring to FIG. 1, the system illustrated therein essentially comprises a gravity feed retort 2 generally to which, for purposes of illustration, is connected three particle feed hoppers 4, 6, and 8, the function and operation of which is explained below using the devolatilization of subdivided carbonaceous material containing oil shale as an example, However, it should be understood that other subdivided materials, including other subdivided carbonaceous material containing particles, and other particulate material, may be treated in a substantially equivalent manner.

Each of hoppers 4, 6, and 8, are connected to retort 2 by means of feed line 12, 14, and 16, and their associated flow controlling valves 18, 22, and 24, respectively. At the bottom of retort 2 hot gas line 26 controlled by valve 28 provides a means for injecting hot gas into retort 2. Spent shale line 32 controlled by valve 34 is located at the lower portion of retort 2 for the withdrawal of the heat treated solid material from the bottom of retort 2. At the top of the retort is located gas outlet line 36, including control valve 38.

In a devolatilizing operation, carbonaceous material containing particles, such as oil shale, is separated into two or more, in the case illustrated, three groupings, of particle size distributions may be treated. In accordance with the practice of the present invention, the particles having the largest size distribution continuum are placed in uppermost hopper 4, the particles having the smallest size distribution continuum are placed in lowest hopper 8, and the particles having a size distribution continuum intermediate between the particles placed in hopper 4 and the particles placed in hopper 8 are placed into intermediate hopper 6. Hot gas, in this case a non-oxidizing gas heated to a temperature of, for example about, 1200° F. (649° C.) is inserted into the bottom of retort 2 through hot gas line 26, with the rate of gas flow being controlled at a non-turbulent flow rate by valve 28.

In operation, in accordance with the teaching of the present invention, after the non-turbulent flow of hot gas has been initiated through line 26 and retort 2 has been brought to the desired temperature for devolatilization of the oil shale, then valves 18, 22, and 24 are opened, substantially simultaneously, to allow the insertion of solid carbonaceous material containing particles into retort 2. As the largest particles descend from feed line 12 into the retort they are immediately contacted by upwardly flowing hot gasses and are subjected to heating due to heat exchange with those hot gasses. Thus the largest particles remain within the system and are heated from the time they exit line 12 into retort 2, substantially until they are withdrawn from the bottom of retort 2. In a similar manner intermediate sized particles are inserted into the retort from hopper 6 through feed line 14 under the control of valve 22, and the smallest size particles are inserted into the retort from hopper 8 through feed line 16 under the control of valve 24. In each of these latter two instances the particles remain within the retort and are heated from the time they are inserted into retort 2 substantially until the time they are withdrawn from the bottom of the retort. All of the particles, from whichever hopper they are withdrawn, flow, under the effects of gravity, substantially straight and non-turbulently through retort 2.

Each of the particles, as they undergo heating, have organic materials vaporized and volatilized from them. These vapors are withdrawn from the top of retort 2, along with the heated gasses, through pipe line 36 under the control valve 38. The heated, treated, now substantially carbonaceous material free solid particles reach the bottom of retort 2. The solid particles are then directed to solid outlet line 32 under the control of valve 34 and removed from retort 2 for any desired further use.

It is thus seen that in the operation of the present invention the largest particles, which are inserted into the retort at the highest level, reside within the retort for the longest period of time and are subjected to the longest heating period. In a similar manner intermediate size particles reside within the retort for a shorter time and are subjected to heating for a shorter period of time than the largest particles, while the smallest particles reside within the retort for the shortest period of time and are subjected to heating for the shortest period of time. Additionally the insertion of the largest size particles at the upper portion of the retort causes the descending large particles to act substantially as both a cap and a filter for the smaller particles, with the result that from the time the intermediate and smaller particles are contacted by the descending largest particles they all move to the bottom of the retort at substantially the same rate of speed. It will be understood that the particles are not in free fall, but descend, at a controlled rate, which rate is primarily controlled by the rate of take-off through line 32. Therefore, the residence time of substantially each particle within the retort is a function of their point of insertion, into the retort. Furthermore, as already noted, larger particles descending from above all of the other particles tend to provide and maintain a constant cap upon the upward flow of smaller and finer particles and hot gases, which in turn helps to keep small particles from moving upward in the retort and thus maintains a more uniform pressure within the retort.

With this description of the system in mind, a more detailed theoretical description of a two incremental particle size and a three incremental particle size oil shale gravity retort system are now given.

EXAMPLE I

In this example 200 lb (91 kg)/hr ft$^2$ of 1 inch (2.5 cm) particles would be fed to a gravity flow retort from upper hopper 4 or 6, and 100 lb (45kg)/hr ft$^2$ of $\frac{1}{8}$ inch (0.3 cm) particles would be fed to the same retort below the entry level of the larger particlessay from hopper 8. Within this system 277 lb (126 kg)/hr ft$^2$ of hot gas would be fed into the retorting zone at 1200° F. (649° C.) from line 26 and leave at 300° F. (149° C.) from line 36. Under these conditions a bed height of about 3 feet (91.4 cm) would be required to heat the 1 inch (2.5 cm) particles in the upper zone to a temperature of about 800° F. (427° C.). Therefore, at 3 feet (91.4 cm), or more, below the point of insertion of the 1 inch (2.5 cm) particles, the 100 lb (45 kg)/hr ft$^2$ of $\frac{1}{8}$ inch (0.3 cm) particles would be introduced into the retort. Even though these smaller particles may be cold when inserted, the additional bed height needed to heat all of the particles to a devolatilizing temperature of about 900° F. (482° C.) or above would be substantially controlled by the heating rate of the larger mass of larger particles, that additional bed height being only approximately 6 inches (15.2 cm). Even then the smaller particles would be found to be heated somewhat hotter than the larger particles. In this example it would also be found that the pressure drop within the retort would be only about one-third of what it would be for a mixture of 1 inch (2.5 cm) and $\frac{1}{8}$ inch (0.3 cm) particles inserted into and moving together through the same length of heating zone.

EXAMPLE II

In this example a three incremental particle size system for the practice of the present invention is described. It might operate as follows with 150 lb(68 kg)/hr ft$^2$ of 2.5 to 1.5 inch (6.4 to 3.8 cm) particles being fed into gravity flow retort 2 from hopper 4 through line 12, while 3 ft (91.4 cm) below the bottom entry point of line 12, 150 lb(68 kg)/hr ft$^2$ of 1.5 to 0.5 inch (3.8 to 1.3 cm) particles would be fed to retort 2 from hopper 6 through line 14. Then 4.5 ft (137 cm) below line 12, 100 lb (45 kg) of 0.5 to 0.2 inch (1.3 to 0.5 cm) particles would be fed to the retort from hoppers 8 by line 16. With this system 380 lb (173 kg)/hr ft$^2$ of 1200° F. (649° C.) steam could be fed to the retort at 7 ft (213 cm) below the entry point of line 12. The particles would be heated to, and exit the retorting zone at, about 900° F. (482° C.). Overall pressure drop would again be only one-third of that it would be in the same retort with all the same particles being fed as a mixture from the top.

The system of the present invention is quite flexible, and subject to modification and use over a wide range of conditions. It will be found that, the size of the largest particles to be heated, the length of the heating zone, and the temperature of the heating gas are related. For example, for heated steam having a temperature of about 1200° F. (649° C.), largest particles of up to about 6 inches (15.2 cm) would require a retort heating zone of only about 21 feet (640 cm), largest particles of up to about 3 to 4 inches (7.6 to 10.2 cm) would require a heating zone of about 14 feet (427 cm), and as shown in the examples, 1.5 to 2.5 inch particles (3.8 to 6.4 cm) would require a heating zone of about 7 feet (213 cm) and 1 inch (2.5 cm) largest particles a heating zone of about 3 ft (91.4 cm), and so on. In the practice of the present invention, the relationship between particle size and heating zone length will substantially retain this ratio, but vary directly with changes in temperature.

There appears to be no actual limit to the smallness of the smallest particles which could be treated in the practice of the present invention, however, due to voltage limitations, the weight of the smallest particles should probably not exceed about 40% of the entire weight of particles undergoing treatment. In a similar manner, the very largest particles being treated in accordance with the system of the present invention may constitute as little as about 5% by weight, to as much as about 99% by weight of the particles undergoing treatment. The amount and size of intermediate sized particles may of course vary greatly within these limits, say about 1% to about 94% by weight. Any heating temperature which will bring the to-be-treated particles to the required devolatilizing, or other required reaction temperature, may be utilized in the practice of the present invention. The mass flow rate and temperature of the heating gas may be selected according to well known principles of heat exchange. The gas selected to heat the particles may vary widely although, for treating carbonaceous material containing particles, non-oxidizing gasses will normally be utilized.

The mult-level feeding of successively smaller particles as taught by the present invention, allows smaller particles to be processed than could normally be processed in a mixture of particle sizes. The insertion of the larger particles at the highest level also serves as a filter for gas entrained fine particles, thus substantially reducing pressure drop within the retort.

While the system and its operation have been described with reference to the devolatization of oil shale, it will be understood that other carbonaceous material containing solids, such as coal, lignite, peat, tar sands, coke, oil coke, cellulosic materials, and so on, may be treated substantially as described. This system may also be used for the carbonization of carbonaceous material containing solids by the appropriate choice of gas and temperature. The invention as described with reference to the drawing may be applied to other processes involving the use of a gravity retort with a similar improvement in reduced pressure drop.

While the foregoing preferred embodiments have been described and illustrated it is understood that alterations and modifications may be made thereto and fall within the scope of the invention as claimed.

What is claimed is:

1. In the method of thermolytically treating solid particles having a range of particle sizes in a substantially vertical gravity feed gas heated retort, said retort having an upper portion and a lower portion including a heated gas inlet, wherein substantially all of said particles are substantially continuously downwardly nonturbulently flowing in said retort due to the effect of gravity while being heated with continuously upwardly flowing heated gases, said gases flowing upwardly from said gas inlet at a nonfluidizing rate relative to said particles, wherein the improvement comprises reducing pressure drop in said retort and maintaining the residence time in said retort of each said solid particle directly proportional to the size of each said solid particle by:

obtaining at least two portions of to-be-treated particles including a first portion which includes the largest to-be-treated particles while substantially excluding the smallest particles, substantially all the to-be-treated particles in said first portion having a particle size of at least one inch (2.5 cm), and a second portion including substantially all of the smallest to-be-treated particles, substantially all of the to-be-treated particles in said second portion having a particle size less than 1 inch (2.5 cm);

inserting said first portion including said largest particles into an upper portion of said retort; and inserting the second portion including said smallest particles into a lower portion of said retort at a vertical location below where said first portion is inserted.

2. The method of claim 1 wherein said to-be-treated particles are divided into two or more portions each portion having a substantially specific, substantially different and non-overlapping size distribution continuum; inserting the portion including the largest to-be-treated particle size distribution into an upper portion of said retort; and then inserting each portion including each next progressively smaller particle size continuum into said retort at progressively lower portions of said retort.

3. The method of claim 1 wherein said first portion contains in the range of about five percent (5%) to about ninety-nine percent (99%) by weight of the entire weight of the particles undergoing treatment, and said second portion contains in the range of about one percent (1%) to about forty percent (40%) by weight of said particles undergoing treatment.

4. The method of claim 3 wherein there are one or more intermediate particle size distribution portions undergoing treatment in said retort, and said intermediate particle size portions contain from about one percent (1%) to about ninety-four (94%) by weight of said particles undergoing treatment.

5. The process of claim 4 wherein substantially all the to-be-treated particles in said first portion have a particle size of at least 1.5 inches (3.8 cm), substantially all of the to-be-treated particles in said second portion have a particle size no greater than 0.5 inches (1.3 cm), and substantially all the particles in said intermediate particle size portions have a particle size of no greater than 1.5 inches (3.8 cm) and a particle size no less than 0.5 inches (1.3 cm).

6. The method of claim 1 wherein the to-be-treated particulate solids include carbonaceous material.

7. The method of claim 6 wherein the carbonaceous material including solids are selected from the group consisting of oil shale, coal, lignite, peat, tar sands, coke, oil coke, and cellulosic material.

8. The method of claim 6 wherein the to-be-treated solid is oil shale.

9. The method of claim 1 wherein the location for inserting each said particle portion into said retort, the temperature of said heated gas, and the mass of said heated gas are selected so that said each particle is substantially uniformly heated.

10. The method of claim 9 wherein at initial heated gas temperatures of about 1200° F. (649° C.) utilizing largest to-be-treated particles of about 6 inches (15.2 cm), and a gas to particle mass ratio in the range of about 0.5 to 1, to 1 to 1, then the retort heating zone is at least about 21 feet (640 cm) in length.

11. The method of claim 9 wherein at initial heated gas temperatures of about 1200° F. (649° C.) utilizing largest to-be-treated particles in the range of about 3 to 4 inches (7.6 to 10.2 cm) and a gas to particle mass ratio in the range of about 0.5 to 1, to 1 to 1, then the retort heating zone is at least about 14 feet (427 cm) in length.

12. The method of claim 9 wherein at an initial heated gas temperature of about 1200° F. (649° C.) utilizing largest particles in the range of about 1.5 to 2.5 inches (3.8 to 6.4 cm) and a gas to particle mass ratio in the range of about 0.5 to 1, to 1 to 1, then the retort heating zone is at least about 7 feet (213 cm) in length.

13. The method of claim 9 wherein at an initial heated gas temperature of about 1200° F. (649° C.) utilizing largest particles of about 1 inch (2.5 cm) and a gas to particle mass ratio in the range of about 0.5 to 1, to 1 to 1, then the retort heating zone is at least about 3 feet (91.4 cm) in length.

* * * * *

UNITED STATES PATENT AND TRADEMARK OFFICE
CERTIFICATE OF CORRECTION

PATENT NO. : 4,424,021
DATED : January 3, 1984
INVENTOR(S) : LaVaun S. Merrill, Jr.

It is certified that error appears in the above-identified patent and that said Letters Patent are hereby corrected as shown below:

Col. 2, line 51: Insert --,-- following "small".
Col. 3, line 51: Delete "in" and insert --is--.
Col. 7, line 66: Delete "hoppers" and insert --hopper--.
Col. 8, line 27-28: Delete "voltage" and insert --voidage--.
Col. 10, line 17: Delete "particulate solids" and insert --solid particles--.
Col. 10, line 19: Delete "solids" and insert --solid particles--.
Col. 10, line 23: Delete "is" and insert --particles are--.

Signed and Sealed this

Third Day of July 1984

[SEAL]

Attest:

GERALD J. MOSSINGHOFF

Attesting Officer

Commissioner of Patents and Trademarks